US006654912B1

(12) United States Patent
Viswanathan et al.

(10) Patent No.: US 6,654,912 B1
(45) Date of Patent: Nov. 25, 2003

(54) RECOVERY OF FILE SYSTEM DATA IN FILE SERVERS MIRRORED FILE SYSTEM VOLUMES

(75) Inventors: Srinivasan Viswanathan, Fremont, CA (US); Steven R. Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 540 days.

(21) Appl. No.: 09/684,487

(22) Filed: Oct. 4, 2000

(51) Int. Cl.$^7$ .......................... H02H 3/05; G06F 12/00; G06F 17/30

(52) U.S. Cl. .............................. 714/42; 714/5; 714/6; 714/7; 714/8; 711/161; 711/162; 707/204

(58) Field of Search ............................. 714/5, 6, 7, 8, 714/42; 711/111, 112, 113, 114, 161, 162; 707/204

(56) References Cited

U.S. PATENT DOCUMENTS

| 4,761,785 A | 8/1988 | Clark et al. |
| 4,875,159 A | 10/1989 | Cary et al. |

(List continued on next page.)

FOREIGN PATENT DOCUMENTS

| EP | 0 462 917 A2 | 12/1991 |
| EP | 0 492 808 A2 | 7/1992 |
| EP | 0537098 | 4/1993 |
| EP | 0 552 580 A3 | 7/1993 |
| EP | 0 767 431 A1 | 4/1997 |
| WO | WO 94/29796 A1 | 12/1994 |
| WO | WO 99/66401 A1 | 12/1999 |
| WO | WO 00/07104 A1 | 2/2000 |
| WO | WO 01/31446 A1 | 5/2001 |
| WO | WO 01/43368 A1 | 6/2001 |

OTHER PUBLICATIONS

Jim Gray et al., "Parity Striping of Disc Arrays: Low–Cost Reliable Storage with Acceptable Throughput", Tandem Computers Inc., 19333 Vallco Parkway, Cupertino, CA, International Conference on Very Large Data Bases, 16$^{th}$. Int. Conference, Aug. 13–16, 1990, Brisbane, AU (1990) Aug. 13–16, New York, US. XP000522459.

Dave Hitz, et al., "File System Design for an NFS File Server Appliance", Technical report 3002, Rev. C 3/95, Presented Jan. 19, 1994, USENIX Winter 1994, San Francisco, California.

David Hitz, "An NFS File Server Appliance", Technical Report TR01, Rev. A 8/93, Network Appliance Corporation, Santa Clara, California.

(List continued on next page.)

Primary Examiner—Robert Beausoliel
Assistant Examiner—Emerson Puente
(74) Attorney, Agent, or Firm—Swernofsky Law Group PC

(57) ABSTRACT

The invention provides a method and system for recovery of file system data in file servers having mirrored file system volumes. The invention makes use of a "snapshot" feature of a robust file system (the "WAFL File System") disclosed in the Incorporated Disclosures, to rapidly determined which of two or more mirrored volumes is most up-to-date, and which file blocks of the most recent mirrored volume have been changed from each one of the mirrored file systems. In a preferred embodiment, among a plurality of mirrored volumes, the invention rapidly determines which is the most up-to-date by examining a consistency point number maintained by the WAFL File System at each mirrored volume. The invention rapidly pairwise determines what blocks are shared between that most up-to-date mirrored volume and each other mirrored volume, in response to a snapshot of the file system maintained at each mirrored volume and are stored in common pairwise between each mirrored volume and the most up-to-date mirrored volume. The invention re synchronizes only those blocks that have been changed between the common snapshot and the most up-to-date snapshot.

6 Claims, 2 Drawing Sheets

U.S. PATENT DOCUMENTS

| | | |
|---|---|---|
| 4,897,781 A | 1/1990 | Chang et al. |
| 4,937,763 A | 6/1990 | Mott .......................... 364/550 |
| 5,067,099 A | 11/1991 | McCown et al. ........... 364/550 |
| 5,163,148 A | 11/1992 | Walls |
| 5,208,813 A | 5/1993 | Stallmo |
| 5,235,601 A | 8/1993 | Stallmo et al. |
| 5,276,867 A | 1/1994 | Kenley et al. |
| 5,305,326 A | 4/1994 | Solomon et al. |
| 5,313,626 A | 5/1994 | Jones et al. |
| 5,335,235 A | 8/1994 | Arnott |
| 5,355,453 A | 10/1994 | Row et al. |
| 5,357,509 A | 10/1994 | Ohizumi |
| 5,604,862 A * | 2/1997 | Midgely et al. ................ 714/6 |
| 5,649,152 A | 7/1997 | Ohran et al. |
| 5,649,196 A | 7/1997 | Woodhill et al. |
| 5,666,353 A | 9/1997 | Klausmeier et al. |
| 5,819,292 A * | 10/1998 | Hitz et al. .................. 707/203 |
| 5,819,310 A | 10/1998 | Vishlitzky et al. |
| 5,835,953 A * | 11/1998 | Ohran ........................ 711/162 |
| 5,873,101 A | 2/1999 | Klein |
| 5,907,672 A | 5/1999 | Matze et al. |
| 5,948,110 A | 9/1999 | Hitz et al. |
| 5,963,962 A | 10/1999 | Hitz et al. |
| 5,996,086 A | 11/1999 | Delaney et al. |
| 5,996,106 A | 11/1999 | Seyyedy |
| 6,101,585 A | 8/2000 | Brown et al. |
| 6,119,244 A | 9/2000 | Schoenthal et al. |
| 6,182,198 B1 * | 1/2001 | Hubis et al. ................. 711/162 |
| 6,212,531 B1 * | 4/2001 | Blea et al. .................. 707/204 |
| 6,341,341 B1 * | 1/2002 | Grummon et al. .......... 711/162 |
| 6,397,307 B2 * | 5/2002 | Ohran ........................ 711/161 |
| 6,549,921 B1 * | 4/2003 | Ofek .......................... 707/204 |

OTHER PUBLICATIONS

Steven R. Kleiman, "Using NUMA Interconnects for Highly Available Filers", 1999 IEEE.

Jai Menon et al., "The Architecture of a Fault–Tolerant Cached RAID Controller", IBM Almaden Research Center, San Jose, California, 1993 IEEE, XP000398988.

Mulqueen, John T., "Product Analysis Review", Communications Week, v452, p.25(1), May 3, 1993.

Slashdot: TUX2: "The File System That Would Be King", Microsoft Internet Explorer, pp. 1–16, Oct. 20, 2000.

* cited by examiner

RECOVERY OF FILE SYSTEM DATA IN FILE SERVERS MIRRORED FILE SYSTEM VOLUMES

BACKGROUND OF THE INVENTION

1. Field of the Invention

The invention relates to recovery of file system data in file servers having mirrored file system volumes.

2. Related Art

Network file servers and other file systems are subject to errors and other failures, including those arising from hardware failure, software error, or erroneous configuration. Because of the possibility of error, many file systems provide additional copies of data in the file system, such as by providing a mirrored file system volume. In a mirrored file system, a first volume provides a first copy of the file system, while a second volume provides a synchronous, second copy of the file system. Thus, if data on the first volume is corrupted or otherwise lost, data from the second volume can be used in its place transparently.

One problem in the known art is that the first volume and second volume of the file system can fail to remain in synchronization. Thus, each volume of the mirrored file system would include a set of files or other objects from a different timestamp (or checkpoint) in the file system history. As a result, the first volume and second volume will no longer serve as accurate mirrors for each other because one is out-of-date. An aspect of this problem is that, after system crashes, it is unknown which of the first volume and second volume is the most recent. Accordingly, it would be desirable to assure that the first volume and second volume of the file system remain synchronized after system crashes. If it is not possible for the first volume and second volume to remain synchronized, it is desirable to rapidly determine which is the most recent version and use efficiently, so as to cause resynchronization.

A first known method is to resynchronize the two mirror copies after system crashes by copying every block. While this method can generally achieve the result of assuring that the first copy and second copy of the file system are synchronized after system crashes, it has the severe drawback that it is very inefficient, as each file block of at least one of the mirror file systems must be copied to the other one of the mirror file systems. When the file system is particularly large, such as one that approaches or exceeds a terabyte in size, this drawback makes this known method untenable due to its incredible latency (and liability to other failures).

A second known method is to maintain a log of regions or file blocks in each mirrored volume that have been changed (sometimes known as "dirty" file blocks). When such a log is maintained, it is only necessary to copy those file blocks that are dirty, rather than an entire mirrored volume. While this method can generally achieve the result otherwise achieved by the first known method, is still subject to at least two drawbacks. First, this method is more complex, in that it requires careful maintenance so as to ensure that the log remains synchronous. Second, the log itself must generally be mirrored for reliability, which of course re introduces the entire problem of recovery of mirrored files after system crashes. Third, maintaining this additional log increases the latency of every operation. Moreover, such a technique can introduce additional errors in the event that the log is unreliable.

Accordingly, it would be desirable to provide a technique for recovery of file system data in file servers having mirrored file system volumes that is not subject to drawbacks of the known art.

SUMMARY OF THE INVENTION

The invention provides a method and system for recovery of file system data in file servers having mirrored file system volumes. In a preferred embodiment, the invention makes use of a consistency point model including a snapshot feature of a robust file system (the "WAFL File System"), such as disclosed in the Incorporated Disclosures, to rapidly determine which of two or more mirrored volumes is most up-to-date, and which blocks of the most recent mirrored volume have been changed from each one of the mirrored file systems. Among a plurality of two or more mirrored volumes, the invention rapidly determines which is the most up-to-date by examining a most recent consistency point number maintained by the WAFL File System at each mirrored volume. The invention rapidly and reliably determines what blocks are shared between that most up-to-date mirrored volume and each other mirrored volume, in response to a snapshot of the file system maintained at each mirrored volume and are stored in common pairwise between each mirrored volume and the most up-to-date mirrored volume. The invention copies only those blocks that have been changed between the common snapshot and the most up-to-date snapshot. This rapid and reliable comparison of blocks, followed by the efficient transfer of those blocks that have been changed, does not present drawbacks of the known art.

The invention provides an enabling technology for a wide variety of applications for file system recovery using redundant file systems, so as to obtain substantial advantages and capabilities that are novel and non-obvious in view of the known art. Examples described below primarily relate to mirrored file system volumes in a network file server, but the invention is broadly applicable to many different types of redundant file systems, such as those used in RAID subsystems and parallel storage systems.

DETAILED DESCRIPTION OF THE PREFERRED EMBODIMENT

Figure 1:
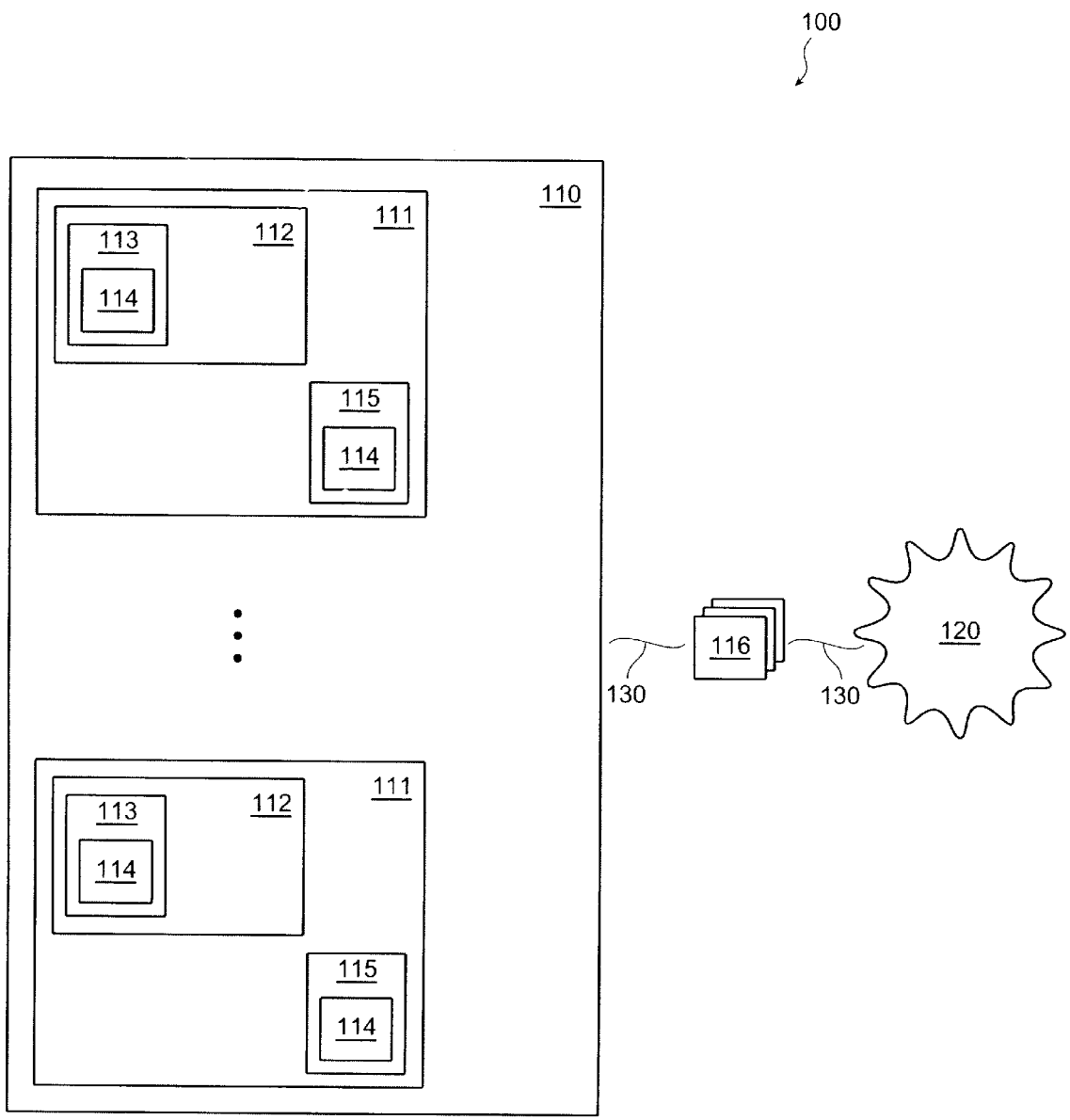
FIG. 1 shows a block diagram of a system for recovery of file system data in file servers having mirrored file system volumes.

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

- block—in general, any collection of data for data objects in a file system.
- consistency point—in general, any point at which the consistency of a file system is assured or recorded.
- file server—in general, any device which responds to messages requesting file system operations.
- file system—in general, any organization or structure of information for storage or retrieval.
- file system data—in general, any information recorded in a file system or an object in a file system.
- file system volume—in general, any mass storage device, or collection thereof, for storage or retrieval of file system objects.
- mirrored volume—in general, any file system volume having a copy of at least a portion of another file system volume.
- parallel storage system—in general, any file system in which data is recorded, in whole or in part, in multiple locations or multiple ways.
- RAID subsystem—in general, any system including a redundant array of mass storage drives.
- recovery of file system data—in general, any recopying or regeneration of information from one memory or storage medium to another.
- redundant file system—in general, any file system in which data is recorded, in whole or in part, with additional information allowing the recovery of at least a portion of that data.
- re-synchronize—in general, any operation in which objects in a file system are reorganized or rewritten to assure that file system objects maintain or restore synchronization.
- shared file block—in general, any file block whose data contents are located on more than one file system volume.
- snapshot—in general, any consistent file system available, in whole or in part, for later retrieval even if the snapshot is not a current consistent file system.
- up-to-date—in general, a measure of recentness of a file system, file system object, or snapshot.
- WAFL File System—in general, a file system as described in the Incorporated Disclosures, or any file system in which at least one snapshot is maintained in addition to a current consistent file system.

As noted above, these descriptions of general meanings of these terms are not intended to be limiting, only illustrative. Other and further applications of the invention, including extensions of these terms and concepts, would be clear to those of ordinary skill in the art after perusing this application. hese other and further applications are part of the scope and spirit of the invention, and would be clear to those of ordinary skill in the art, without further invention or undue experimentation.

System Elements

FIG. 1 shows a block diagram of a system for recovery of file system data in file servers having mirrored file system volumes.

A system 100 includes a file server (or other device) 110, a communication network 120, and a network interface 130. The file server 110 includes a plurality of mirrored file system volumes 111, each of which includes mass storage for recording and retrieving data. Each file system volume 111 includes at least one snapshot 112 according to the WAFL File System, as described in the Incorporated Disclosures. Each snapshot 112 includes a file system information block 113, including a pointer to an entire consistent file system and a consistency point value 114 indicating a sequence in which that snapshot 112 was generated.

Each file system volume 111 also includes an active file system 115, itself associated with a consistent point value 114. In a preferred embodiment, snapshots 112 are made periodically in response to (and as copies of) an active file system 115. Thus, while every snapshot 112 includes a consistent point value 114 from its associated active file system 115, not every active file system 115 is made into a snapshot, and thus not every consistency point value 114 is associated with a snapshot 112.

The file server 110 receives messages 116 requesting to write data or otherwise alter data from the communication network 120 using the network interface 130. In normal operation, the file server 110 parses those messages 116 and writes the same data to both of the active file systems 115 of the mirrored file system volumes 111, so that each of the mirrored file system volumes 111 includes the same active file systems 115, the same snapshots 112, therefore the same data. However, in the event of a system crash or other error, it might occur that one or more of the mirrored file system volumes 111 fails to remain in synchronization with the others, either because its active file system 115 is not up-to-date or its snapshots 112 are not up-to-date.

If one or more of the mirrored file system volumes 111 is not in synchronization with the others, there will be at least one mirrored file system volume 111 having an active file system 115 with a consistency point value 114 larger than all others. This indicates that the associated an active file system 115 and the associated file system volume 111 (with the highest consistency point value 114) is the most up-to-date file system volume 111 of all of the mirrored file system volumes 111.

Similarly, for any pair of mirrored file system volumes 111, there will be at least one common snapshot 112 present for them both, thus having the same consistency point value 114 for the common snapshot 112 at each of the two mirrored file system volumes 111. For any pair of mirrored file system volumes 111 A and B, the difference between the common snapshot 112 and the most up-to-date active file system 115 (say, at mirrored file system volume 111 A) can be easily and rapidly determined using the WAFL File System. The file blocks indicated by that difference are the only file blocks necessary for re-synchronization between the pair of mirrored file system volumes 111 A and B.

While each pair (A and B) of mirrored file system volumes 111 will have at least one common snapshot 112, of which one can be compared with the most up-to-date active file system 115, there is no particular requirement that each other pair (A and C, or A and D) of mirrored file system volumes 111 will have the same common snapshot 112 as the first such pair (A and B). However, for each such other pair (A and C, or A and D) of mirrored file system volumes 111, the difference between the common snapshot 112 and the most up-to-date active file system 115 can still be easily and rapidly determined using the WAFL File System; the file blocks indicated by that difference are the only file blocks necessary for re-synchronization between the other pair (A and C, or A and D) of mirrored file system volumes 111.

Method of Operation

Figure 2:
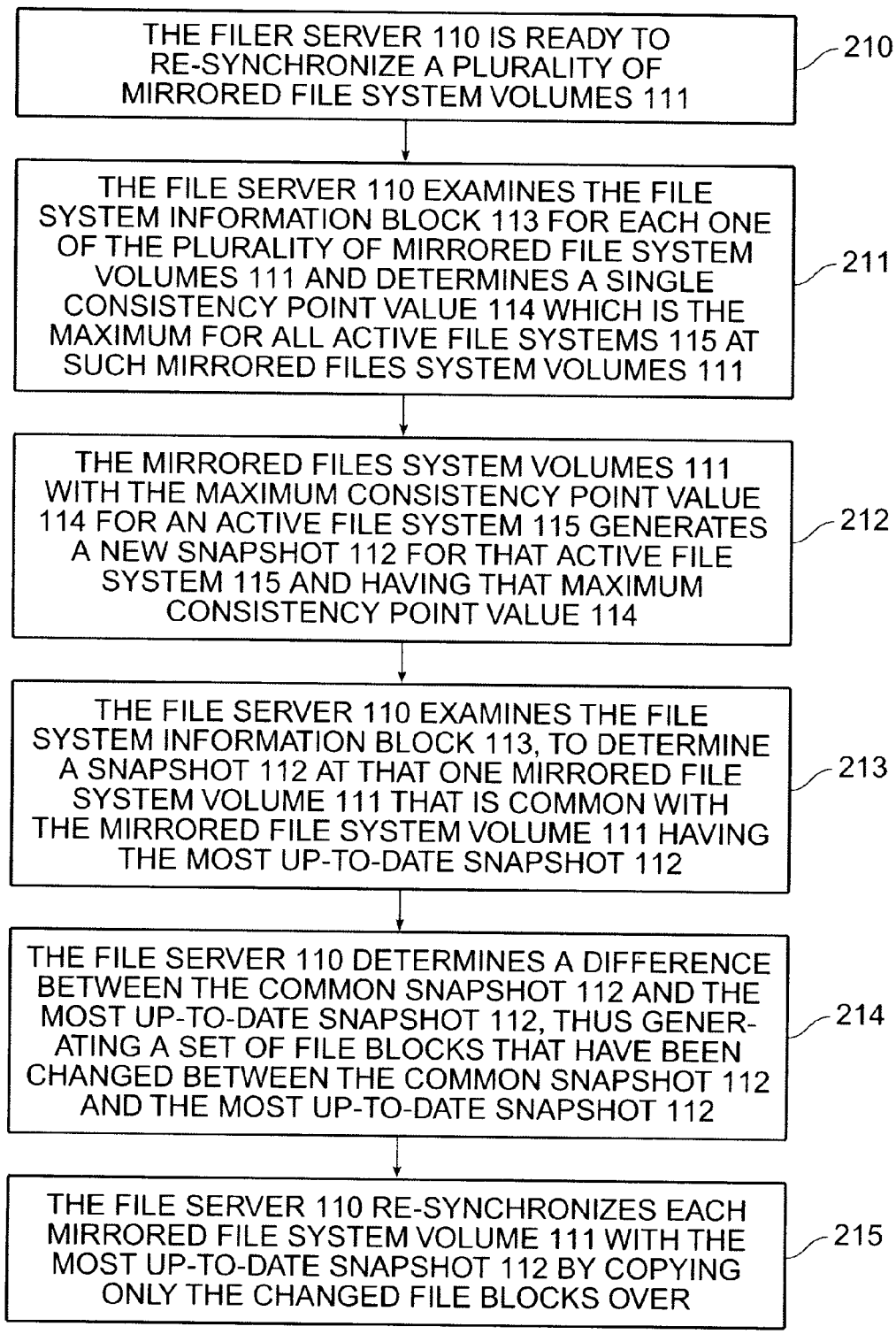
FIG. 2 shows a process flow diagram of a method for operating a system as in FIG. 1.

FIG. 2 shows a process flow diagram of a method for operating a system as in FIG. 1.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the file server 110 is ready to re-synchronize a plurality of mirrored file system volumes 111.

At a step 211, the file server 110 examines the file system information block 113 for each one of the plurality of mirrored file system volumes 111, to determine a single consistency point value 114 which is the maximum for all active file systems 115 at such mirrored file system volumes 111. While it is possible that there will be more than one such mirrored file system volume 111 having an active file system 115 with that maximum consistency point value 114, there is no particular requirement to select one of such mirrored file system volumes 111 in preference to others, as all active file systems 115 with that identical consistency point value 114 will be identical.

At a step 212, the mirrored file system volumes 111 with the maximum consistency point value 114 for an active file system 115 generates a new snapshot 112 for that active file system 115 and having that maximum consistency point value 114. This new snapshot 112 is thus the most up-to-date snapshot 112 and has the maximum consistency point value 114.

At a step 213, for each one of the plurality of mirrored file system volumes 111 (other than the file system volumes 111 with the most up-to-date active file system 115) the file server 110 examines the file system information block 113, to determine a snapshot 112 at that one mirrored file system volume 111 that is common with the mirrored file system volume 111 having the most up-to-date snapshot 112. Thus, the file server 110 determines a closest degree of synchronization between each mirrored file system volume 111 (in turn) and the mirrored file system volume 111 having the most up-to-date snapshot 112.

At a step 214, for each such closest degree of synchronization, the file server 110 determines a difference between the common snapshot 112 and the most up-to-date snapshot 112, thus generating a set of file blocks that have been changed between the common snapshot 112 and the most up-to-date snapshot 112. These changed file blocks are the only file blocks required to be re-synchronized between the common snapshot 112 and the most up-to-date active file system 115.

At a step 215, for each such set of changed file blocks, the file server 110 re-synchronizes each mirrored file system volume 111 with the most up-to-date snapshot 112 by copying only the changed file blocks over, thus generating a copy of the most up-to-date snapshot 112 at each mirrored file system volume 111.

In a preferred embodiment, there are only two such mirrored file system volumes 111. The file server 110 needs to make only one comparison to determine the maximum consistency point value 114 for a most up-to-date active file system 115. The file server 110 needs to examine only one pair of mirrored file system volumes 111 for a common snapshot 112. The file server 110 needs to determine only one set of changed blocks between the common snapshot 112 and the most up-to-date snapshot 112. The file server 110 needs to copy only one set of changed blocks from one mirrored file system volume 111 to the other.

However, in alternative embodiments, there may be more than two mirrored file system volumes 111. Those skilled in the art will see, after perusal of this application, that the invention is easily and readily generalized to additional mirrored file system volumes 111, without undue experimentation or further invention.

In a preferred embodiment, the mirrored file system volumes 111 can each be updated to create new active file systems 115 in response to messages 116 requesting file system operations, even while the snapshot 112 at each mirrored file system volumes 111 is being synchronized with the most up-to-date snapshot 112. Thus, the mirrored file system volumes 111 can each perform the full functions of a file server 110 mirrored file system volume 111 even while the re-synchronization is taking place.

After this step, the method 200 has re-synchronized all of the mirrored file system volumes 111 to the most up-to-date active file system 115.

In a preferred embodiment, the method 200 is performed each time the system 100 recovers from a system crash, as part of the crash recovery process. In alternative embodiments, the method 200 may be performed in response to other events, such as in response to a timer, in response to detection of lack of synchronization between the mirrored volumes, or in response to operator command.

Generality of the Invention

The invention has general applicability to various fields of use, not necessarily related to the services described above. For example, these fields of use can include one or more of, or some combination of, the following:

file system recovery using redundant file systems other than mirrored file system volumes RAID subsystems parallel storage systems Other and further applications of the invention in its most general form, will be clear to those skilled in the art after perusal of this application, and are within the scope and spirit of the invention. Although preferred embodiments are disclosed herein, many variations are possible which remain within the concept, scope, and spirit of the invention, and these variations would become clear to those skilled in the art after perusal of this application.

What is claimed is:

1. A method, including steps of examining a plurality of mirrored file system volumes for a consistency point value;

determining a most up-to-date said file system volume in response to said steps of examining; and selecting a set of changed file blocks between said up-to-date said file system and each one of said plurality of mirrored file system volumes.

2. A method as in claim 1, wherein said steps of selecting include determining a snapshot held in common between said most up-to-date said file system volume and at least one of said plurality of mirrored file system volumes; and selecting those file blocks changed between said snapshot held in common and said up-to-date said file system volume.

3. A method as in claim 1 or 2, including steps of re-synchronizing at least one of said plurality of mirrored file system volumes in response to said steps of selecting.

4. Apparatus including a plurality of mirrored file system volumes, each having at least one snapshot including an entire consistent file system, each said snapshot having a consistency point value;

a first comparison element capable of being coupled to a plurality of said consistency point values;

a second comparison element, responsive to an output of said first comparison element, said second comparison element being capable of being coupled (a) to a first snapshot associated with said output on a first said volume and (b) to a second snapshot associated with a second said volume, said second comparison element being capable of providing a selection of file blocks in response thereto.

5. Apparatus as in claim 4, wherein said second snapshot is held in common between said first volume and said second volume.

6. Apparatus as in claim 4 or 5, including an element capable of re-synchronizing at least one of said plurality of mirrored file system volumes in response to said second comparison element.

* * * * *